United States Patent
Bartussek et al.

(10) Patent No.: US 6,244,295 B1
(45) Date of Patent: Jun. 12, 2001

(54) NON-RETURN VALVE, ESPECIALLY FOR A PISTON PUMP

(75) Inventors: Walter Bartussek, Waltenhofen; Joerg Heusinkveld, Immenstadt; Hubert Hueber, Weitnau; Werner Rittler, Immenstadt; Juergen Haecker, Markgroeningen; Harald Ott, Leonberg; Harald Aicher, Blaichach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/297,826

(22) PCT Filed: Jul. 16, 1998

(86) PCT No.: PCT/DE98/01996

§ 371 Date: Jul. 14, 1999

§ 102(e) Date: Jul. 14, 1999

(87) PCT Pub. No.: WO99/13252

PCT Pub. Date: Mar. 18, 1999

(30) Foreign Application Priority Data

Sep. 11, 1997 (DE) .............................. 197 39 904

(51) Int. Cl.$^7$ .................................................. F16R 15/04
(52) U.S. Cl. ............................ 137/540; 137/539; 251/337
(58) Field of Search ............................. 137/540, 543.19, 137/539, 535; 251/337

(56) References Cited

U.S. PATENT DOCUMENTS

| | | | |
|---|---|---|---|
| 1,229,885 | * 6/1917 | Chadwick | 137/540 |
| 2,697,915 | * 12/1954 | Chisholm | 137/540 |
| 2,912,000 | * 11/1959 | Green | 137/540 |
| 2,912,001 | * 11/1959 | Green | 137/540 |
| 3,421,547 | * 1/1969 | Aslan | 137/539 |
| 3,542,155 | * 11/1970 | Kern et al. | 137/539 |
| 3,580,275 | * 5/1971 | Hanson et al. | 137/540 |
| 3,725,990 | * 4/1973 | Petersen et al. | 137/539 |
| 3,735,777 | * 5/1973 | Katzer et al. | 137/540 |
| 3,854,496 | * 12/1974 | Broszeit | 137/540 |
| 3,895,647 | * 7/1975 | Willenbrock et al. | 137/535 |
| 4,287,912 | * 9/1981 | Hewett | 137/539 |
| 4,365,648 | * 12/1982 | Grothe | 137/539 |
| 4,675,003 | * 6/1987 | Hooven | 137/539 |
| 4,700,741 | * 10/1987 | Murphy | 137/539 |
| 4,736,768 | * 4/1988 | Tsubouchi et al. | 137/539 |
| 5,299,598 | * 4/1994 | Quartana, III et al. | 137/540 |

FOREIGN PATENT DOCUMENTS 196 22 123A * 12/1997 (DE) .................................. 137/540

* cited by examiner

*Primary Examiner*—John Rivell
(74) *Attorney, Agent, or Firm*—Ronald E. Greigg; Edwin E. Greigg

(57) ABSTRACT

The invention relates to a check valve with a tubular valve housing in which a valve ball is received. To make a large flow cross section available and to prevent closure by the valve ball when the check valve is fully open, a perforated disk is press-fitted between longitudinally extending guide ribs of the valve housing and a circumferential wall of the valve housing there is an interstice as an outflow opening, which is not closed even the valve ball contacts the perforated disk. The valve housing is made by stamping, in which the guide ribs and a valve seat are made in one operation and are thereby aligned exactly with one another. In this way, a small radial play of the valve ball can be realized.

19 Claims, 4 Drawing Sheets

NON-RETURN VALVE, ESPECIALLY FOR A PISTON PUMP

PRIOR ART

The invention is based on a check valve for an oil circulation system.

One such check valve, intended especially for an oil circulation system in an internal combustion engine, is known from European Patent Disclosure EP 0 268 520 B1. The known check valve has a tubular valve housing, on one end of which a valve seat is formed and in whose other end a closure element is inserted that between itself and the valve seat encloses a valve closing body in the form of a valve ball received in the valve housing. The closure element is a part that is geometrically relatively complicated, with a radial flange by which it is mounted in the valve housing, and with a tube segment or truncated cone, protruding integrally from the radial flange into the interior of the valve housing, that serves as a stop for the valve closing body and forms a valve stroke limitation.

ADVANTAGES OF THE INVENTION

The valve housing of the check valve of the invention, has inward-protruding guide ribs for guiding the valve closing body. The preferably disk-shaped retaining element is mounted on these guide ribs, for instance by press-fitting in the axial direction into the valve housing. Between an outer rim of the retaining element and an inside of a circumferential wall of the valve housing, there is a radial spacing, or in other words an interstice, through which the fluid can flow. There is a large low cross section, especially if the closure element is provided with one or more flow openings. With the interstice, despite a desired large flow cross section, an overall small structural side of the check valve can advantageously be attained.

Because the check valve can be embodied in such a way that the flow cross section in the interstice does not decrease even if the valve closing body is sharply deflected, the valve closing body has less tendency to vibrate, which advantageously reduces noise and increases the durability of the check valve.

By shaping the valve housing radially inward in the region of the retaining element, the hold of the retaining element in the valve housing is made stronger.

The check valve of the invention is preferably provided in a piston pump, in particular as an inlet valve and/or outlet valve of the piston pump. The piston pump is intended in particular as a pump in a brake system of a vehicle and is used in controlling the pressure in wheel brake cylinders. The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

BRIEF DESCRIPTION OF DRAWINGS

The invention will be described in further detail below in terms of exemplary embodiments shown in the drawing. Shown are.

DESCRIPTION OF THE EXEMPLARY EMBODIMENTS

Figure 1:
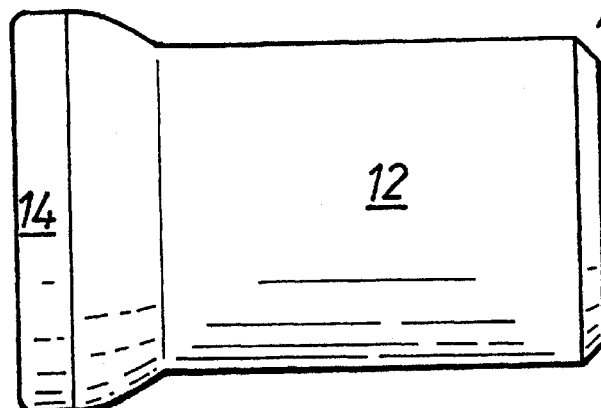
FIG. 1, an elevation view of a check valve according to the invention.
Figure 2:
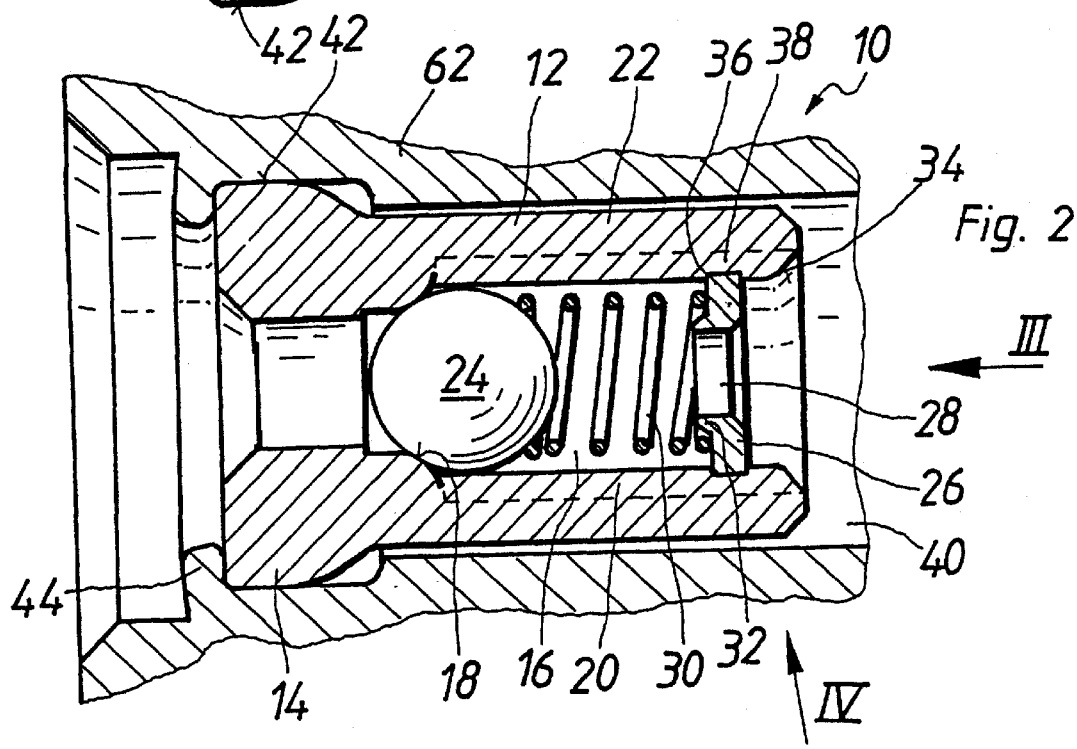
FIG. 2, an axial section of the check valve of FIG. 1, inserted into a fluid-carrying bore.
Figure 3:
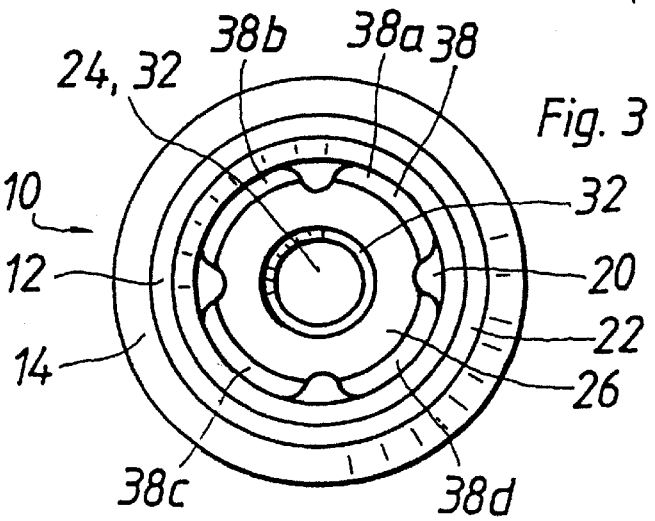
FIG. 3, an end view on an outflow side of the check valve of the invention, in the direction of arrow III in FIG. 2.

The check valve 10 of the invention, shown in FIGS. 1–3, has a valve housing 12 with a radially protruding sealing collar 14 extending all the way around on an inflow end. For reasons of space and to attain high stability while using little material, the preferably selected valve housing shown in the drawing is tubular in design.

An axial through bore 16 widens in a flow direction at an encompassing annular shoulder, which forms a valve seat 18. In the preferably selected exemplary embodiment, the valve seat 18 is embodied as crowned in convex fashion, but can also be frustoconical, for instance. Extending away from the valve seat 18 in the flow direction, that is, toward an outflow end of the check valve 10, the valve housing 12 has a plurality of guide ribs 20, preferably from 3 to 6 and in particular four of them, which protrude radially inward from an inside of a circumferential wall 22 of a valve housing 12. The guide ribs 20 are preferably distributed equidistantly over the circumference. They guide a valve closing body, which in the exemplary embodiment shown is embodied as a valve ball 24, with little radial play between the guide ribs 20 in the valve housing 12.

Near the outflow end, a perforated disk 26 with a center hole 28 is mounted in the valve housing 12. It encloses the valve ball 24 between itself and the valve seat 18 in the valve housing 12. A helical compression spring as the valve closing spring 30 is braced against the perforated disk 26, which forms a closure element of the housing 12, and presses the valve ball 24 against the valve seat 18. The perforated disk 26 is a stamped or embossed sheet-metal part or an injection molded plastic part, on which a collar 32 surrounding the center hole 28 is embodied, centering the valve closing spring 30. The perforated disk retained by the valve housing 12 assures that the valve ball 24 will not fall out of the through hole 16. Because the perforated disk 26 holds the valve ball 24 in the valve housing 12, the perforated disk 26 can also be called a retaining element.

In the exemplary embodiments preferably selected for the description, the valve closing spring 30 urges the valve ball 24 with little prestressing against the valve seat 18. In some cases, if prestressing that urges the valve ball 24 against the valve seat 18 is not necessary, then the valve closing spring 30 can also be dispensed with. In that case, the perforated disk 26 holds the valve ball 24 directly in the valve housing 12. In the exemplary embodiments shown, that is, when the valve closing spring 30 is present, the perforated disk 26 or retaining element holds the valve closing spring 30 directly but also holds the valve ball indirectly, via the valve closing spring 30, in the valve housing 12. The perforated disk 26 secured in the valve housing 12, assures a constant spacing between the valve seat 18 and the perforated disk 26 and thus a constant prestressing force of the valve ball 24 against the valve seat 18.

The perforated disk 26 is press-fitted into the valve housing 12 in the axial direction. The outer circumference of the perforated disk 26 and the inward-pointing circumferential surface, interrupted by the interstice 38, of the guide ribs 20 are adapted to one another such that after the perforated disk 26 has been press-fitted into the valve housing 12, a high pressure that firmly and securely holds the perforated disk 26 in the valve housing 12 occurs between the outer circumference of the perforated disk 26 and the inner circumference of the guide ribs 20. This firm hold of the perforated disk 26 in the valve housing 12 can be further reinforced by a local deformation of the guide ribs 20. To make the press-fitting easier, the guide ribs 20 are provided with chamfers 34 on their outflow ends, and a front peripheral edge 36, that is, in the front in terms of the press-fitting direction, of the perforated disk 26 is rounded. The guide ribs 20 hold the perforated disk 26 with radial spacing from the circumferential wall 22 of the valve housing 12; that is, there is an interstice 38 between an outer rim of the perforated disk 26 and an inside of the circumferential wall 22. In the preferably selected exemplary embodiment in which four guide ribs are provided, the interstice 38 is composed of four individual partitions 38a, 38b, 38c and 38d (FIG. 3). This interstice 38 forms a flow opening that is in addition to the center hole 28 of the perforated disk 26, that the check valve 10 of the invention overall has a large flow cross section. If there is a great pressure difference between the inflow and outflow sides, or if the check valve 10 is not provided with a valve closing spring 30, and the valve ball 24 is seated on the perforated disk 26 and closes the center hole 28 thereof, then the interstice 38 still makes a large flow cross section available. If there is a great pressure difference between the inflow side and the outflow side, the valve ball 24 lifts far from the valve seat 18, and the individual windings of the valve closing spring 30 come relatively close together, as a result of which the portion of the fluid flowing through the center hole 28 is throttled in the region of the windings. Because of the interstice 38, however, there is still a large enough flow cross section left over. This has the advantage that the individual windings of the valve closing spring 30 can come relatively close together, and as a result the check valve 10 overall can be made short in structure.

When the check valve 12 opens, the throttling in the region of the windings of the valve closing spring 30 is also less perceptible, and the valve ball 24 therefore has less tendency to vibrate, and accordingly the proposed check valve 12 emits less undesired noise yet remains functional for longer.

Because of the interstice 38, it is even possible to dispense with the center hole 28 entirely.

The valve ball 24 has a smaller diameter than an inside diameter of the circumferential wall 22 of the valve housing 12 downstream of the valve seat 18, so that even in the region of the valve ball 24, a large flow cross section is available. In the proposed check valve 12, in terms of cross section, regardless of the instantaneous position of the valve ball 24, the entire interstice 38 is available as a flow cross section.

The valve housing 12 is produced as a plastic injection-molded part or metal and by a shaping operation, in particular by impact molding. The valve seat 18 and guide ribs 20 are produced in a single shaping operation, which assures high accuracy in the axial guidance of the valve ball 24 by the guide ribs 20 relative to the valve seat 18. Axial guidance of the valve ball 24 with close tolerances in the radial direction can be achieved.

The close radially oriented guidance of the valve closing body, in the selected exemplary embodiments of the valve ball 24, serves to reduce undesired noise, because as a result of the close guidance, the valve closing body cannot strike as hard against the valve housing 12. The relatively large available flow cross section between the outer circumference of the valve ball 24 and the inside of the circumferential wall 22 of the valve housing 12, or in other words the interstice 38 between the guide ribs 20, also makes itself felt in a favorable way in terms of the intended reduction of undesired noise, because as a consequence of the relatively large open interstice 38, the valve closing body or valve ball 24 has less tendency to vibrate. It is also favorable in particular that the interstice 38 is fully effected even at a short stroke of the valve ball 24.

After the impact molding of the valve housing 12, the valve seat 18 is reembossed, in order to improve its sealing quality and increase its hardness and thus its wear resistance.

As shown in FIG. 2, it is provided that the check valve 10 of the invention be inserted into a stepped, fluid-carrying bore 40 of a housing 62. The sealing collar 14 of the valve housing 12, in cooperation with the bore 40 in the housing 62, has a press-fit, so that the check valve 10 is held and sealed off in the fluid-carrying bore 40. An outer circumference of the sealing collar 14 forms a sealing face 42. In addition, the check valve 10 in the fluid-carrying bore 40 is held and sealed off by a caulking 44. To prevent the press fit between the sealing collar 14 and the fluid-carrying bore 40 from deforming the valve seat 18, the valve seat 18 has an axial spacing from the sealing face 42 of the sealing collar 14. As a result, the intended radial play between the valve ball 24 and the guide ribs 20 is also unimpaired by the press fit.

Figure 4:
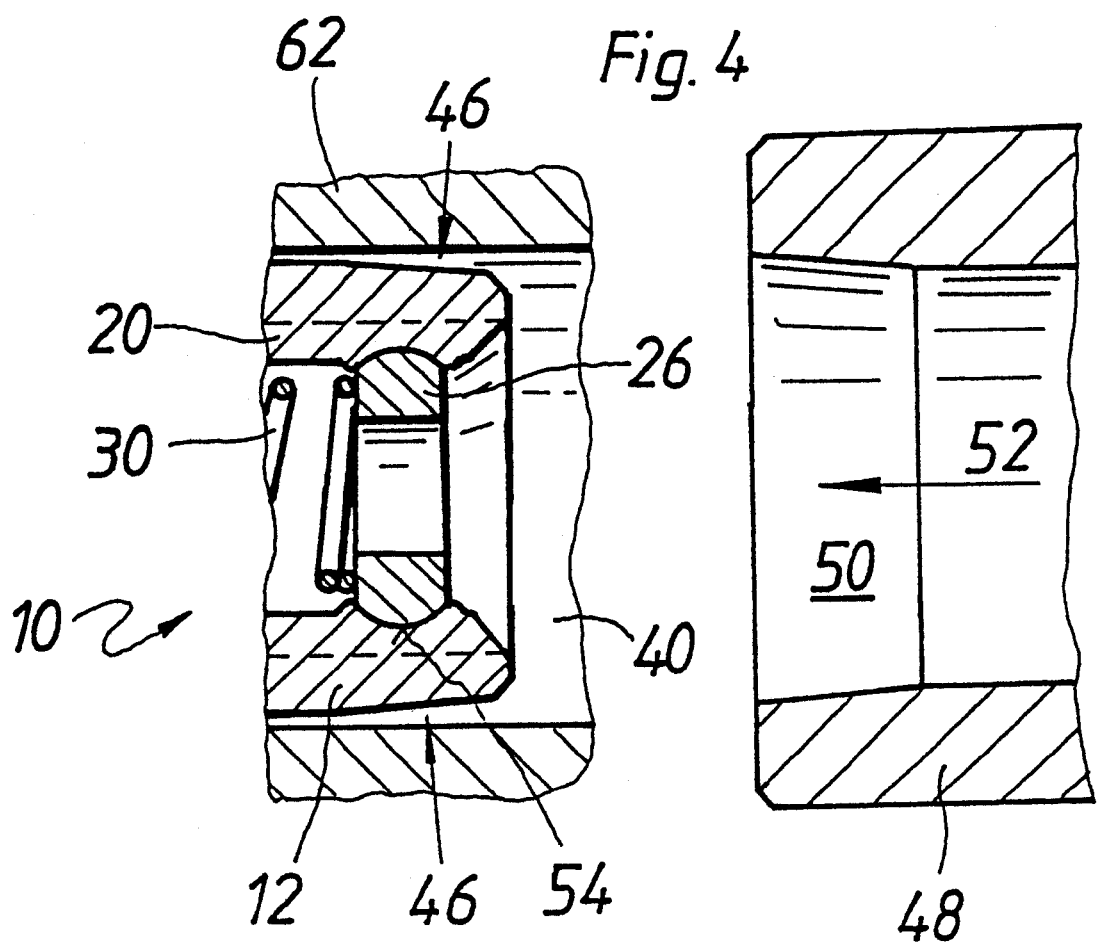
FIG. 4, a detail of a modified embodiment of the check valve of the invention, in the direction of the arrow IV in FIG. 2.

FIG. 4 shows an outflow end of the valve housing 12 of a modified embodiment of the invention, in axial section. In the region of the retaining element, which in this exemplary embodiment is again embodied as a perforated disk 26, the valve housing 12 is deformed radially inward by the exertion of force from outside (arrows 46); as a result, the perforated disk 26 presses into the guide ribs 20, deforming them plastically. As a result, the hold of the perforated disk 26 in the valve housing 12 is made considerably stronger; a releasing force that is required to snap the perforated disk 26 axially out of the valve housing 12 is increased by a factor of approximately 6 to 8, compared with a merely press-fitted perforated disk 26. The radially inward shaping of the valve housing 12 is effected with a tool die 48, shown on the right in FIG. 4, which has a conical socket 50 that is press-fitted axially, that is, in the direction of the arrow 52, onto the valve housing 12 (naturally, before the valve housing is inserted into the fluid-carrying bore 40. And thereby acts upon the valve housing 12 in the region of the perforated disk 26 uniformly over the entire circumference with the radially inward-acting shaping force 46.

An outer rim 54 of the perforated disk 26 shown in FIG. 4 is embodied in crowned or spherical fashion, to make it easier to press-fit the perforated disk 26 into the valve housing 12. The perforated disk 26 of the exemplary embodiment of the invention shown in FIG. 4, unlike the perforated disk 26 of the exemplary embodiment of the invention shown in FIG. 2, is embodied in mirror symmetry to an imaginary plane of the perforated disk 26, so that it is unnecessary to orient the perforated disk 26 before inserting it by a press-fit, and the effort and expense of producing the check valve 10 are thus reduced. In this exemplary embodiment, the guidance of the valve closing spring 30 is effected at the inward-pointing, circumferentially interrupted circumferential face of the guide ribs 20.

Figure 5:
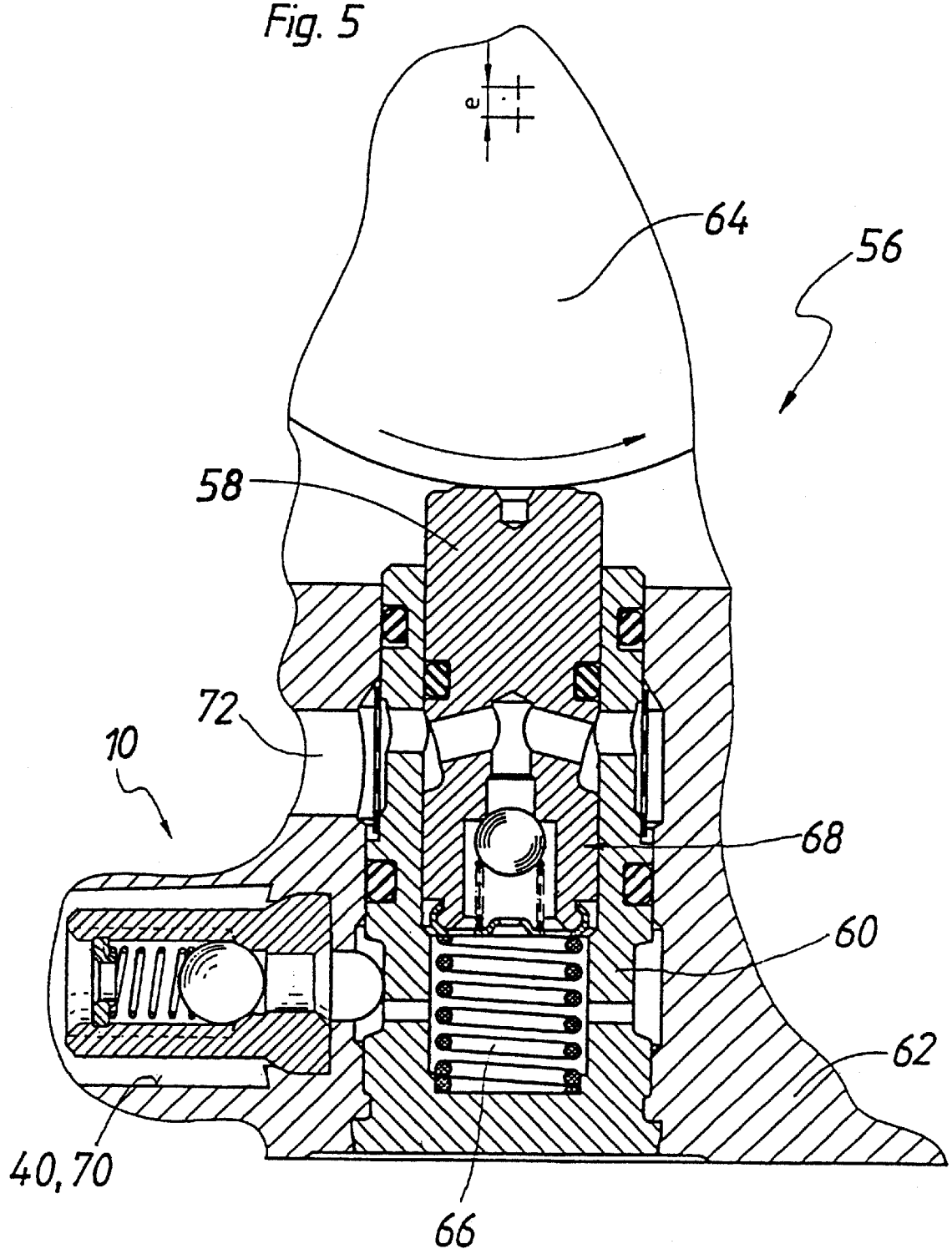
FIG. 5, a piston pump with a check valve according to the invention in axial section.

FIG. 5 shows a piston pump 56 with the check valve 10 of FIGS. 1–3 according to the invention. The piston pump 56 is intended as a pump for a hydraulic brake system, for instance with slip control and not otherwise shown, for vehicles. Such piston pumps 56 are known per in their structure and function and will therefore be explained only briefly below.

The piston pump 56 has a piston 58, which is axially displaceably guided in a bush 60. The bush 60 is inserted firmly into the housing 62, which in the preferably selected exemplary embodiment can also be called a pump housing. For driving the piston 58, an eccentric element 64 of eccentricity e is used, which can be driven to rotate by an electric motor and against whose circumference the piston 58 is pressed by a piston restoring spring 66. A spring-loaded check valve is integrated in the form of an inlet valve 68 with the piston 58.

As an outlet valve, the check valve 10 of the invention is inserted into the housing 62. In the exemplary embodiment preferably selected for FIG. 5, the fluid-carrying bore 40 acts as an outlet conduit 70 for the piston pump 56. As described in conjunction with FIGS. 1–4, the check valve 10 is built into the fluid-carrying bore 40 or outlet conduit 70 (FIG. 5) and sealed off. The bore 40 or outlet conduit 70 is mounted in the pump housing 62 radially to the piston pump 56. Instead of the radial disposition of the check valve 10, an axial disposition, particularly in the extension of the piston 50, would also be possible (not shown). The check valve 10 of the invention can selectively be used not only as an outlet valve (not shown) as an inlet valve for the piston pump 56. To that end, it can for instance be inserted into an inlet bore 72 of the housing 62 or integrated with the piston 58. In other words, the inlet valve 68 integrated with the piston 58 as shown in FIG. 5 can also be constructed in the same way as the check valve 10 described in conjunction with FIGS. 1–4; in that case, the piston 58 of the piston pump 56 takes the place of the housing 62.

Figure 6:
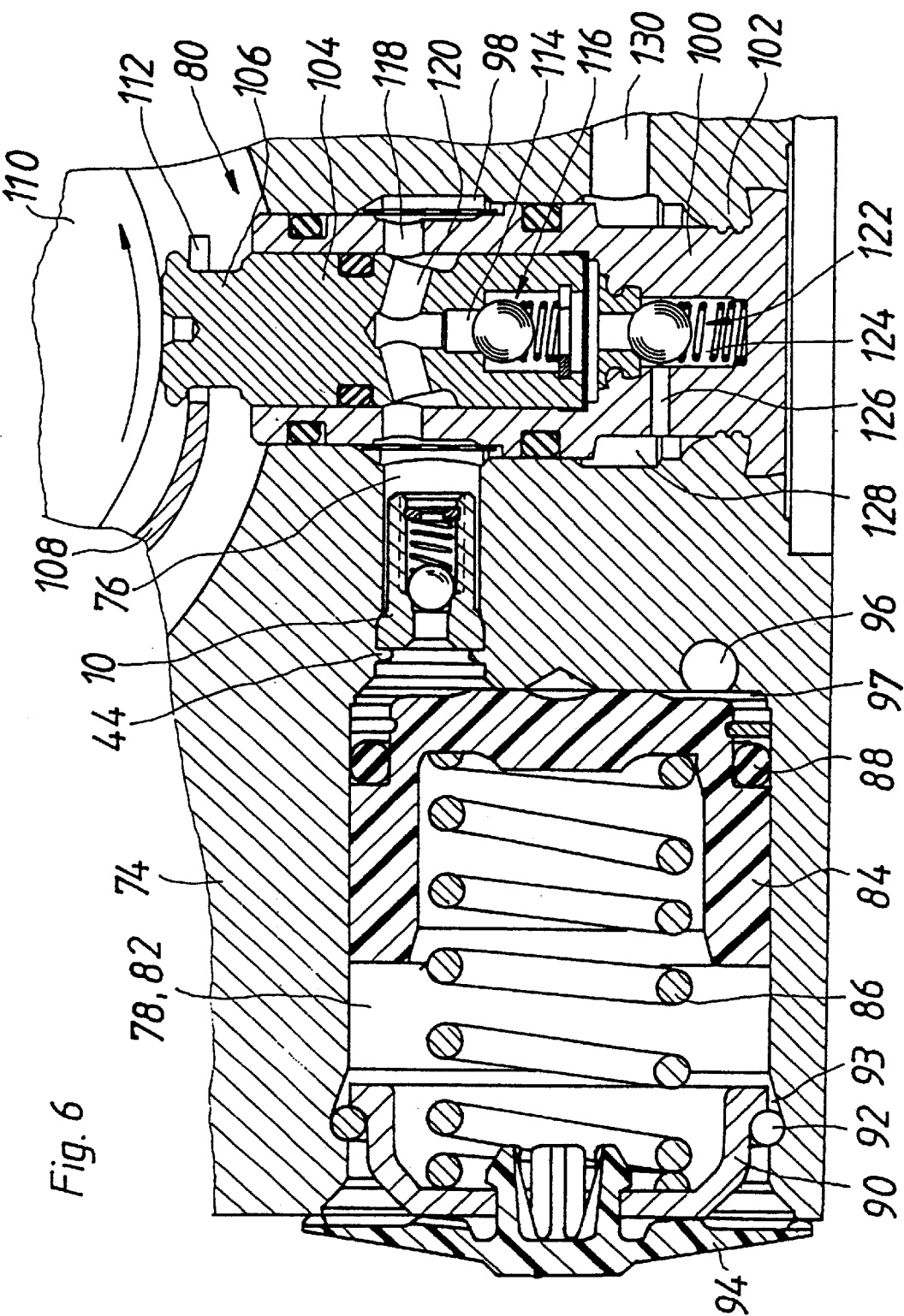
FIG. 6, a section through a hydraulic block of a valve brake system according to the invention.

FIG. 6 shows a fragmentary view of a hydraulic block 74 of a valve brake system that has a slip control system and also has the check valve 10 according to the invention as shown in FIGS. 1–3. The check valve 10 is inserted into a connecting bore 76, which leads from a hydraulic reservoir 78 to an intake side of a piston pump 80. The check valve 10 can experience a flow through it from the hydraulic reservoir 78 to the piston pump 80. Other hydraulic components, such as magnetic valves and dampers, are inserted into the hydraulic block 74 and hydraulically connected to one another, to the hydraulic reservoir 78 and to the piston pump 80, but are not shown in the drawing for the sake of clarity. All that is shown in the drawing of the hydraulic block 74 is a fragment that includes he piston pump 80, check valve 10, and hydraulic reservoir 78.

The hydraulic reservoir 78 has a cylindrical blind bore 82 as its reservoir chamber, into which a reservoir piston 84 is inserted axially displaceably. The reservoir piston 84 is urged by a reservoir spring 86 in the form of a helical compression spring in the direction of a bottom of the blind bore forming the reservoir chamber 82. With an O ring 88, the reservoir piston 84 is sealed off in the reservoir chamber 82.

The reservoir spring 86 is braced against a closure lid 90, which is mounted in an open face end of the blind bore forming the reservoir chamber 82 by means of a snap ring 92 which is inserted into a groove 93 in the reservoir chamber 82. To prevent dirt or water from penetrating the reservoir chamber 82, a closure cap 94 is clipped into the closure lid 90; this cap covers the open face end of the reservoir chamber 82 and enables an exchange of air between the reservoir chamber 82 and the environment.

Via an inflow conduit 96, which discharges at the bottom of the reservoir chamber 82, the hydraulic reservoir 78 is hydraulically connected, with the interposition of a magnetic outlet valve, not shown, in a manner known per se to a wheel brake cylinder, also not shown. The hydraulic reservoir 78 serves to (temporarily) receive brake fluid let out of the wheel brake cylinder in a slip control mode by means of the outlet valve, not shown. Even when the reservoir piston 84 is pressed toward the bottom of the reservoir chamber 82 by the reservoir spring 86, the inflow conduit 96 communicates with the intake side of the piston pump 80, through an annular chamber 97 between the end face of the reservoir piston 84 and the bottom of the reservoir chamber 82 and the connecting bore 76. The check valve 10 inserted into the connecting bore 76 enables an inflow of brake fluid, let out of the wheel brake cylinder, not shown, to the piston pump 80, but prevents a return flow in the direction of the hydraulic reservoir 78 or into the wheel brake cylinder.

The connecting bore 76 is accommodated eccentrically near a circumference of the reservoir chamber 82, axially parallel to the reservoir chamber 82, on the bottom of the reservoir chamber 82 in the hydraulic block 74. It discharges radially into a cylinder bore 98 in the hydraulic block 74, into which bore the piston pump 80 is inserted. Because the diameter of the reservoir chamber 82 is multiple times larger than that of the connecting bore 76, the insertion of the check valve 10 into the connecting bore 76 and the making of a caulking 44, which fixes the check valve 10 in the connecting bore 76 and brings about sealing, can be accomplished without problems. The insertion of the check valve 10 into the connecting bore 76 is understood to be done before the insertion of the reservoir piston 84 and the other parts of the hydraulic reservoir 78 into the reservoir chamber 82.

In a manner known per se, the piston pump 80 has a bush 100, which is inserted into the connecting bore 98 and is held and sealed off in pressure-tight fashion by a caulking 102, using the so-called self-clinch technique.

A pump piston 104 is axially displaceably received in the bush 100 and has a piston head 106 that is integral with it and protrudes from the bush 100. The piston head 106 is held by a fastening spring in contact with the circumference of an eccentric element 110 that can be driven to rotate by an electric motor; the clip spring 108 embraces the eccentric element 110 and is in engagement, with a forked end 112, with the piston head 106. Driving the eccentric element 110 to rotate causes the pump piston 104 to be driven to execute a stroke motion in the bush 100.

A spring-loaded check valve, as an inlet valve 116 of the piston pump 80, is inserted in a manner known per se into a stepped blind bore 114 of the piston 104. A pump inlet is effected from the connecting bore 76 through radial bores 118 in the bush 100 and transverse bores 120 in the piston 106 into the blind bore 114.

As the outlet valve 122, in a manner known per se, a spring-loaded check valve is inserted into a blind bore 124 into a closed face end of the bush 100 remote from the eccentric element 110. A pump outlet is made from the blind bore 124, which receives the outlet valve 122, through a radial bore 126 in the bush 100 and an annular conduit 128, surrounding the bush 100, in the hydraulic block 74 into a radial outlet bore 130 of the hydraulic block 74.

The foregoing relates to preferred exemplary embodiments of the invention, it being understood that other variants and embodiments thereof are possible within the spirit and scope of the invention, the latter being defined by the appended claims.

What is claimed is:

1. A check valve comprising a valve housing (12) having a through bore that includes a downstream end, the through bore includes a valve seat and guide ribs extending longitudinally that movably guide a valve closing body, received in the valve housing, the closing body is aligned with the valve seat, a retaining element which is mounted in the valve housing, the retaining element keeps the valve closing body between the retaining element and the valve seat, the retaining element (26) is mounted on the guide ribs (20), there is an interstice (38) between the retaining element (26) and an inside of a circumferential wall (22) of the valve housing (12), and on the downstream end of the through bore (16) the retaining element (26) is pressed in an axial direction into the valve housing (12).

2. The check valve according to claim 1, in which the retaining element (26) is disk-shaped.

3. The check valve according to claim 1, in which the retaining element (26) has at least one through hole (28) as an outflow opening of the check valve (10).

4. The check valve according to claim 2, in which the retaining element (26) has at least one through hole (28) as an outflow opening of the check valve (10).

5. The check valve according to claim 1, in which the valve housing (12) is a shaped impact-molded part.

6. The check valve according to claim 1, in which the valve housing (12) has a sealing collar (14) extending all the way around and protruding radially outward.

7. The check valve according to claim 1, in which the valve seat (18) has an axial spacing from a sealing face (42) embodied all the way around on an outer circumference of the valve housing.

8. The check valve according to claim 1, in which the valve housing (12) is shaped radially inward in a region of the retaining element (26).

9. The check valve according to claim 1, in which an outer rim (54) of the retaining element (26) is crowned.

10. The check valve according to claim 1, in which the check valve (10) has a valve closing spring (30), which is braced against the retaining element (26) and urges the valve closing body (24) toward the valve seat (18).

11. The check valve according to claim 2, in which the check valve (10) has a valve closing spring (30), which is braced against the retaining element (26) and urges the valve closing body (24) toward the valve seat (18).

12. A check valve as set forth in claim 1, in which said valve (10) is assembled in a brake system for controlling a fluid flow.

13. The check valve according to claim 12, in which the check valve (10) is connected hydraulically to a wheel brake cylinder with an interposition of an outlet valve, and precedes an intake side of a pump (80), and the check valve (10) experiences a fluid flow through the check valve in a direction of said pump (80).

14. The check valve according to claim 10, in which the check valve (10) is disposed between a hydraulic reservoir (78) and an intake side of a pump (80), and that the check valve (10) experiences a fluid flow through the check valve in a direction of the pump (80).

15. The check valve according to claim 12, in which the valve brake system has a slip control system.

16. A check valve as set forth in claim 1, in combination with a piston which is received and guided axially displaceably in a cylinder bore of a pump housing and the piston is drivably in a reciprocating stroke motion.

17. A check valve as set forth in claim 15, in which the check valve (10) serves as an inlet valve of the piston pump (56).

18. A check valve as set forth in claim 15, in which the check valve (10) serves as an outlet valve of the piston pump (56).

19. The check valve according to claim 1, in which a chamfer is provided on the downstream end of the through bore (16).

* * * * *

UNITED STATES PATENT AND TRADEMARK OFFICE
CERTIFICATE OF CORRECTION

| | |
|---|---|
| PATENT NO. | : 6,244,295 B1 |
| DATED | : June 5, 2001 |
| INVENTOR(S) | : Walter Bartussek et al. |

It is certified that error appears in the above-identified patent and that said Letters Patent is hereby corrected as shown below:

<u>Title page,</u>
Item [54], should read as follows:
[54] CHECK VALVE FOR A PISTON PUMP IN A FLUID CIRCULATION SYSTEM Signed and Sealed this Thirtieth Day of October, 2001

Attest:

NICHOLAS P. GODICI
*Acting Director of the United States Patent and Trademark Office*

*Attesting Officer*